A. WAHL.
APPARATUS FOR THE DELIVERY OF MEASURED QUANTITIES OF LIQUID.
APPLICATION FILED APR. 20, 1911.
997,939.
Patented July 11, 1911.
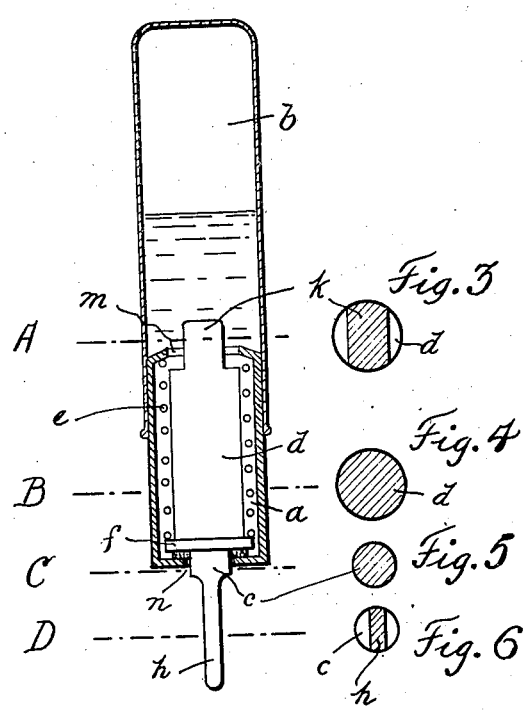
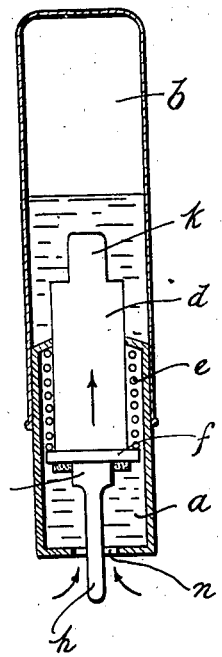

UNITED STATES PATENT OFFICE.

ALFRED WAHL, OF FREIBURG, BREISGAU, GERMANY.

APPARATUS FOR THE DELIVERY OF MEASURED QUANTITIES OF LIQUID.

997,939.  Specification of Letters Patent.  Patented July 11, 1911.

Application filed April 20, 1911. Serial No. 622,354.

*To all whom it may concern:*

Be it known that I, ALFRED WAHL, a subject of the German Empire, residing at Freiburg-in-Breisgau, in Germany, have invented a certain new and useful Improved Apparatus for the Delivery of Measured Quantities of Liquid, of which the following is a specification.

This invention relates to delivery apparatus of the class wherein an automatically closing valve is arranged in a measuring chamber at the bottom of a liquid container, so that it can be opened by forcing it inward, the opening of the valve orifice being accompanied by closing of the measuring chamber to the container.

The present invention consists in constructing this valve as a differential piston which sucks in air, during its upward movement, and positively forces out liquid during its descent.

A construction embodying this device is shown in the accompanying drawings, in which—

Figure 1 is a central vertical section, showing the valve lowered, and Fig. 2 a similar view, showing the valve raised. Figs. 3, 4, 5 and 6 are cross-sections of the valve, taken on the dot and dash lines A, B, C, D of Fig. 1.

The apparatus comprises a measuring chamber $a$, open at top and bottom (the orifices being marked $m$ and $n$ respectively), and a piston-valve whereof the upper part $k$ is flat-sided and is joined to a cylindrical part $d$. Below the latter the piston has a collar $f$ of nearly the same diameter as the interior of the chamber $a$. A spring $e$ bearing on this collar normally thrusts this piston downward against its seat, around the lower orifice $n$ of the chamber $a$, to prevent outflow of liquid. The piston has a short neck $c$ fitting into this orifice, integral with a handle $h$. In this position the measuring chamber $a$ communicates through its upper orifice $m$ with the container $b$ into the lower part of which it is inserted.

When the piston is pushed upward the outflow orifice $n$ at first remains closed by the neck $c$, while the flat-sided part $k$ is leaving a passage in the orifice $m$, between the container and the measuring chamber. During the continued ascent of the piston the orifice $m$ becomes closed by the part $d$, and the outflow orifice $n$ is opened, owing to the fact that the narrow handle $h$ enters the same. During its descent, the piston exerts pressure upon the liquid in the chamber $a$, especially if it should be somewhat viscous, tending to force it out through the orifice $n$, until the latter is closed by the neck $c$, the upper orifice $m$ being at the same time opened, permitting the chamber $a$ to again become filled with the liquid. The piston can be lifted by hand by pressure applied to the part $h$.

What I claim as my invention and desire to secure by Letters Patent of the United States is:—

Apparatus for the delivery of measured quantities of liquid, comprising a container, a measuring chamber having an inflow orifice in communication with said container and an outflow orifice at the bottom, and a piston valve in said chamber, said piston valve having a part adapted to fit into and close the outflow orifice and a part of larger diameter adapted to fit into and close said inflow orifice, both of said valve parts having constant guiding engagement with the walls of their respective orifices and being so proportioned that during the initial movement of the piston the outflow orifice remains closed and the inflow orifice open, and at a later stage of the same movement the inflow orifice becomes closed and the outflow orifice opened, and means to cause the return movement of the piston whereby the liquid will be forced from the measuring chamber.

In witness whereof I have signed this specification in the presence of two witnesses.

ALFRED WAHL.

Witnesses:
WILHELM BURHENN,
MICHAEL KNOBLOTH.